Patented Dec. 17, 1940

2,225,088

UNITED STATES PATENT OFFICE 2,225,088

BENZOYL BENZOIC ACID DERIVATIVES

John M. Tinker, Penns Grove, and Viktor M. Weinmayr, Pitman, N. J., assignors to E. I. du Pont de Nemours & Company, Wilmington, Del., a corporation of Delaware No Drawing. Application December 21, 1939, Serial No. 310,330

6 Claims. (Cl. 260—517)

This invention relates to the preparation of benzoyl benzoic acid derivatives of diphenylmethane and diphenylketone and to the preparation of 2,2'-dianthraquinonylmethane and 2,2'-dianthraquinonylketone from these intermediates.

The object of the invention is to prepare new and valuable dyestuff intermediates capable of extensive use, particularly in the anthraquinone vat dyestuff field.

According to this invention, diphenylmethane is condensed with one or two mols of phthalic anhydride by means of anhydrous aluminum chloride or an equivalent condensing agent. The reaction may be carried out in the presence or absence of the inert solvents. The 4'-benzyl-benzoyl-2-benzoic acid or the 4',4''-di(benzoyl-2-benzoic acid)-methane obtained by the condensation may be oxidized to the corresponding 4'-benzoyl-benzoyl-2-benzoic acid and 4',4''-di-(benzoyl-2-benzoic acid)-ketone. These benzoyl benzoic acid derivatives may then be ring closed to the corresponding anthraquinonylmethanes or ketones. The 4'-benzyl-benzoyl-2-benzoic acid or the 4',4''-di(benzoyl-2-benzoic acid)-methane may likewise be ring closed to the corresponding 2-benzylanthraquinone and the 2,2'-dianthraquinonyl methane, respectively, which compounds may then be oxidized to the corresponding ketones.

By this process the known 2,2'-dianthraquinonylketone which has heretofore been obtainable only with great difficulty becomes readily available as a dyestuff intermediate.

The following examples are given to illustrate the invention more fully. The parts used are by weight.

*Example 1*

467 parts of phthalic anhydride and 854 parts of anhydrous aluminum chloride are agitated in 2560 parts of tetrachloroethane at 50–60° C. for from 15 to 30 minutes. The charge is then cooled to from 0 to 3° C. and 252 parts of diphenylmethane mixed with approximately an equal part of tetrachloroethane to prevent crystallization are added uniformly at the above temperature over a period of one hour. A slow evolution of hydrochloric acid, indicative of the beginning of the reaction, sets in during the charging of the diphenyl methane. The charge is agitated at from 0 to 5° C. for two hours, heated to from 20 to 25° in three hours and maintained at that temperature for 18 hours. The temperature is then raised in three hours to from 40 to 50° and agitation continued at that temperature for six hours. The finished, moderately viscous condensation mass is poured onto ice and hydrochloric acid and the tetrachloroethane is removed with steam. The condensation product, a viscous oil while hot, is agitated with hot water and washed by decantation. A brittle, brown solid is obtained upon cooling, which is dissolved in 4000 parts of a dilute sodium carbonate solution. The deep brown solution is clarified by filtration and slowly run onto 5000 parts of dilute hydrochloric acid preferably below 30° C. The 4',4''-di-(benzoyl-2-benzoic acid) methane is precipitated as a hydrate, which when heated at 100 to 110° C. melts, then dries, and forms a brittle solid at ordinary temperature. 727 parts of crude 4',4''-di(benzoyl-2-benzoic acid) methane are obtained. The product shows no tendency to crystallize from solvents. Likewise its salts can not readily be crystallized from solvents. It forms esters when reacted with alcohols, which esters exhibit plasticizing properties.

*Example 2*

200 parts of crude 4',4''-di(benzoyl-2-benzoic acid) methane are dissolved in 2000 parts of glacial acetic acid and 160 parts of chromic acid anhydride are added at from 95 to 100° C. over a period of six hours. One hour later the mass, containing now an excess of chromic acid, is poured onto about 10,000 parts of ice and water. The white precipitate is filtered, washed and dissolved in 2000 parts of dilute caustic. The clarified solution is slowly poured onto cold dilute hydrochloric acid, the white precipitate is filtered, washed and dried at 110° C. 135 parts of crude 4',4''-di(benzoyl-2-benzoic acid) ketone, which melts at from 210 to 245° C. are obtained. It is very insoluble in benzene or dichlorobenzene and crystallizes with difficulty from glacial acetic acid. The compound melts at from 289 to 292° C. after two crystallizations from glacial acetic acid. The normal dibutyl ester can readily be obtained when the acid chloride (made with thionyl chloride) is being heated with an excess of n-butyl alcohol.

*Example 3*

50 parts crude 4',4''-di(benzoyl-2-benzoic acid) ketone as above obtained and 16 parts of boric acid are dissolved in 500 parts essentially 100% sulfuric acid at about 50° C. The temperature is then rapidly raised to from 195 to 200° C., maintained there for 5 minutes and dropped again quickly to below 150° C. 250 parts of 40% sulfuric acid are added at from 70 to 80° C. to reduce the acidity to 80% H₂SO₄. The 2,2'-dianthraquinonyl ketone which crystallizes out is filtered at about 30° C., washed with 80% sulfuric acid, then with 40% sulfuric acid and finally with hot water until free of acid. The product is extracted with hot dilute caustic to remove any un-ring closed material that may still be present. 24 parts of 2,2'-dianthraquinonyl ketone are obtained, melting at 292–296° C. in a yield of 51.95% based on the crude starting material. Crystallization from 5.5 parts of boiling nitrobenzene per part of product gives pure 2,2'-dianthraquinonyl ketone melting at 302–303° C. and otherwise showing the properties given for this product in the literature (Ber. 65, p. 1338 (1932)).

*Example 4*

347 parts of crude 4',4''-di-(benzoyl-2-benzoic acid) methane are dissolved in 1000 parts of tetrachloroethane and 300 parts of thionyl chloride are added at about 40° C. The formation of the acid chloride takes place at about 60° C. Some of the excess of thionyl chloride is distilled off. 240 parts of anhydrous aluminum chloride are added at 30° C. and the charge is heated to from 120 to 130° C. until no more caustic soluble material is present. The reaction mass is poured onto dilute acid, the solvent removed by a steam distillation, the remaining solid extracted with hot dilute caustic, filtered, washed and dried at 110° C. 340 parts of crude 2,2-dianthraquinonyl methane are obtained. One crystallization from nitrobenzene gives a 2,2'-dianthraquinonyl methane melting at 300° C. It dissolves in concentrated sulfuric acid with yellow color and forms a red vat with alkaline hydrosulfite.

Oxidation with chromic acid in glacial acetic acid gives the known 2,2'-dianthraquinonyl ketone.

*Example 5*

252 parts of diphenyl methane and 148 parts of phthalic anhydride are charged into 500 parts of tetrachloroethane. The charge is cooled to 2° C. and 295 parts of anhydrous aluminum chloride are added. HCl evolution, indicative of reaction sets in at about 10° C. The charge is agitated at from 20 to 25° C. for about 20 hours then worked up in a manner described in Example 1. 4'-benzyl benzoyl-2-benzoic acid, together with little 4',4''-di-(benzoyl-2-benzoic acid)-methane is obtained in substantially quantitative yield. 100 parts of the crude product dissolved in 1000 parts of glacial acetic acid are oxidized with 125 parts of chromic acid anhydride at 100° C. 76 parts of crude 4'-benzoyl benzoyl-2-benzoic acid are obtained when the charge is worked up in the usual manner. The product shows little tendency to crystallize, but a fairly pure 4'-benzoyl benzoyl-2-benzoic acid melting from 232 to 262° C. is obtained by recrystallizing from ethyl acetate. The butyl ester (B. P. 268–280° C./1 mm.) may be prepared by esterifying with secondary butyl alcohol in the presence of a small amount of sulfuric acid.

Other inert solvents such as dichlorobenzene, nitrobenzene, etc., may be employed in place of the solvents mentioned in the above examples. The condensation may also be carried out in the absence of solvents by milling the reagents together according to the process well known in the prior art for preparing simple benzoyl benzoic acid derivatives. The condensations should be carried out at temperatures not exceeding 100° C., to prevent material loss of the diphenyl methane due to side reactions with the aluminum chloride. The reaction is preferably started at temperatures below 10° C.

The benzoyl benzoic acid derivatives of the diphenylmethane may be converted to their esters to be employed as substitutes in many cases for the esters of the heretofore known benzoyl benzoic acids or they may be converted to anthraquinone derivatives as above described.

We claim:

1. Compounds of the general formula

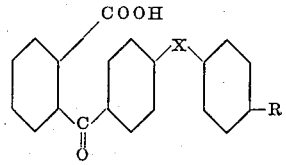

in which X stands for a connecting radical of the class consisting of

and —CH₂, and in which R represents a substituent of the class consisting of hydrogen and

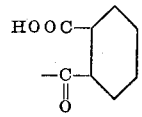

2. 4',4''-di(benzoyl-2-benzoic acid) methane.
3. 4',4''-di(benzoyl-2-benzoic acid) ketone.
4. 4'-benzylbenzoyl-2-benzoic acid.
5. The process which comprises condensing 1 mol of diphenylmethane with 2 mols of phthalic anhydride in the presence of anhydrous aluminum chloride.
6. The process which comprises condensing 1 mol of diphenylmethane with 2 mols of phthalic anhydride in the presence of anhydrous aluminum chloride and oxidizing the resulting compound to convert the methane radical to the ketone.

JOHN M. TINKER.
VIKTOR M. WEINMAYR.